Nov. 3, 1931.  E. H. STORM  1,830,377
MAGNIFYING GLASS
Filed Oct. 30, 1929
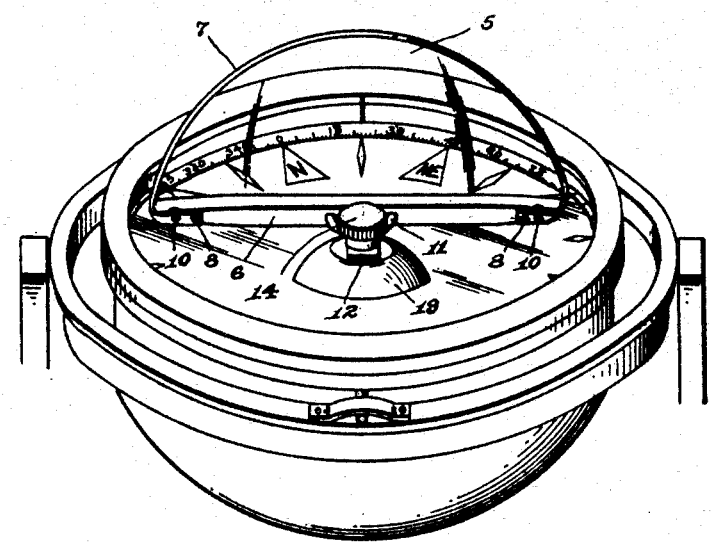
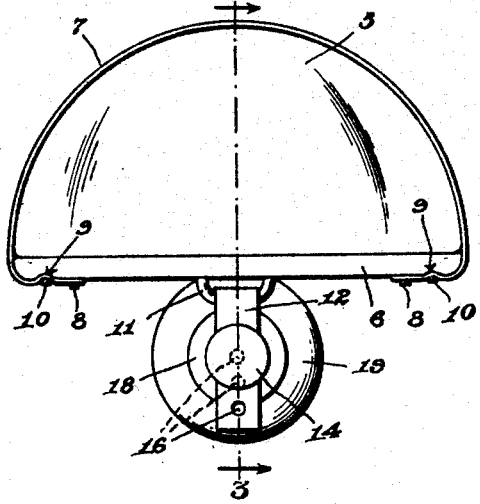 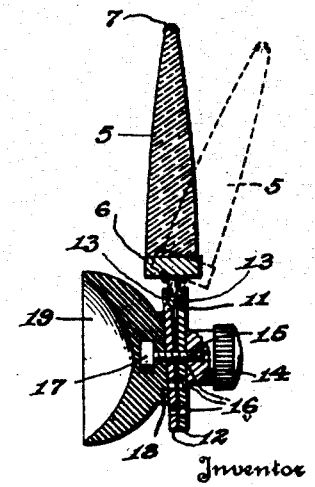
Inventor
*Einer H. Storm*
By *John W. Maupin.*
Attorney Patented Nov. 3, 1931

1,830,377

UNITED STATES PATENT OFFICE

EINER H. STORM, OF SEATTLE, WASHINGTON

MAGNIFYING GLASS

Application filed October 30, 1929. Serial No. 403,457.

My invention relates to magnifying glasses and certain objects of the invention are to provide a magnifying glass of substantially semi-circular design with a novel frame and with suctional means whereby the device may be mounted, for instance, on the glass top of a mariner's compass and by means of which a ship may be steered with a greater degree of accuracy. Other objects of the invention are to provide a magnifying glass having pivotal and frictional adjusting means whereby the glass may be focused by pivotal movement to various positions. Further objects are to provide adjustable means whereby the glass may be moved to greater or less distances from its central mounting thus adapting same for use on devices of various sizes such as a compass and the like.

With the above and other objects in view which will appear as the description proceeds, the invention consists of the novel construction, adaptation, combination and arrangement of parts hereinafter described and claimed. These objects are accomplished by devices illustrated in the accompanying drawings; wherein:—

Figure 1 is a view in perspective showing the device mounted on a mariner's compass;

Fig. 2 is a top plan view of the device; and

Fig. 3 is a view in central vertical section taken substantially on a broken line 3, 3 of Fig. 2.

Referring to the drawings throughout which like reference numerals designate like parts, the numeral 5 indicates the glass of the device which is preferably semi-circular in design whose straight or cut end rests on a base member 6 and its semi-annular periphery is held by a concave rim or binding 7 whose end portions are bent around the ends of the base member and secured on the underside thereof by small screws 8.

Between the screws 8 and the ends of the base member 6 notches or depressions 9 are provided on the underside of the base member and small screws 10 passing through the rim 7 and into said base at said notches provide means whereby the rim may be drawn very tightly around the annular edge portion of the glass as will be understood.

A stirrup 11 is centrally provided on the underside of the base member 6 and two plates 12 have corresponding semi-annular grooves 13 that fit around the straight outer portion of said stirrup which is circular in cross section. Said plates are adapted to be clamped together by a thumb nut 14 that is threaded on to a small bolt 15 that is arranged to pass through one of a plurality of spaced holes 16 in said plates. The head 17 of said bolt is vulcanized into the base portion 18 of a rubber suction cup 19 as clearly shown in Fig. 3 of the drawings.

It will thus be seen that the suction cup 19 serves as the base support for the device when adhesively attached to a smooth surface. The thumb nut 14 may be turned to regulate the clamping engagement of the plates 12 whereby the frictional hold of their coacting grooves 13 on the stirrup 11 may be increased or decreased as desired. Ordinarily this frictional engagement is made sufficient to retain the glass 5 in whatever pivotal position it is placed. It will be obvious that the clamping plates may also be pivotally turned on the bolt 15 if desired.

What I now consider to be the principal usage of my device is illustrated in Fig. 1 of the drawings wherein the device is shown in combination with a mariner's compass. In this usage the rubber suction cup 19 is attached to the top glass of the compass at a point adjacent its center whereby the level disposition of the compass in its gimbals will not be disturbed. By means of the magnifying glass the ship on which the compass is mounted may be steered to the nearest half degree which would be very difficult without some magnifying means. The device is adapted to be used on devices or objects of various sizes by shifting the holes 16 of the plates 12 to the bolt 15 as will be understood.

Having thus described my invention, it being understood that minor changes may be resorted to in its construction without departing from its scope and spirit, what I claim and desire to secure by Letters Patent of the United States is:—

1. A magnifying glass having in combination a support clamp, said clamp comprising a pair of plates adapted to grasp the frame portion of a magnifying glass, and a clamp bolt for said plates imbedded in a rubber suction cup.

2. A magnifying glass having in combination a support clamp, said clamp comprising a pair of plates having complementary grooves in their end portions and a series of holes diametrically disposed through the plates, a bolt imbedded in a rubber suction cup and adapted to be clamped through any of said holes whereby the clamp plates may be adjustably extended, and the grooved ends of said plates adapted to grasp a stirrup on the frame of a magnifying glass whereby the glass may be pivotally adjusted to various positions.

In witness whereof, I hereunto subscribe my name this 23rd day of October, A. D. 1929.

EINER H. STORM.